(12) United States Patent
Ueno

(10) Patent No.: US 11,609,721 B2
(45) Date of Patent: Mar. 21, 2023

(54) PRINTING METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Kikuo Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/476,533

(22) Filed: Sep. 16, 2021

(65) Prior Publication Data

US 2022/0091793 A1 Mar. 24, 2022

(30) Foreign Application Priority Data

Sep. 18, 2020 (JP) .............................. JP2020-156899

(51) Int. Cl.
*G06F 3/12* (2006.01)

(52) U.S. Cl.
CPC .......... *G06F 3/1205* (2013.01); *G06F 3/1222* (2013.01); *G06F 3/1238* (2013.01); *G06F 3/1253* (2013.01); *G06F 3/1284* (2013.01); *G06F 3/1259* (2013.01)

(58) Field of Classification Search
CPC .................................................. G06F 3/1205
USPC .......................................................... 358/1.9
See application file for complete search history.

(56) References Cited

U.S. PATENT DOCUMENTS

| 10,817,236 | B2 | 10/2020 | Saeda et al. |
| 11,087,700 | B1 | 8/2021 | Kumar et al. |
| 2006/0195794 | A1* | 8/2006 | Sun ...................... G06F 9/451 |
| | | | 715/762 |
| 2008/0098021 | A1* | 4/2008 | Harada ............... G03G 15/5087 |
| | | | 707/999.102 |
| 2009/0199275 | A1* | 8/2009 | Brock ..................... H04L 51/04 |
| | | | 715/716 |
| 2012/0140251 | A1* | 6/2012 | Grodsky ............ H04N 1/32144 |
| | | | 358/1.9 |
| 2016/0105644 | A1 | 4/2016 | Smith et al. |
| 2017/0078525 | A1 | 3/2017 | Kubota |
| 2017/0085731 | A1 | 3/2017 | Akuzawa |
| 2017/0118373 | A1 | 4/2017 | Morita |
| 2019/0310809 | A1 | 10/2019 | Sekine |
| 2019/0354324 | A1* | 11/2019 | Kakitsuba ............. G06F 3/1204 |
| 2020/0349048 | A1 | 11/2020 | Ito |
| 2022/0009241 | A1 | 1/2022 | Azechi et al. |

(Continued)

FOREIGN PATENT DOCUMENTS

JP 2019-202441 A 11/2019

*Primary Examiner* — Jacky X Zheng

(74) *Attorney, Agent, or Firm* — Global IP Counselors, LLP

(57) ABSTRACT

A printing method includes a customizing step of receiving a customization instruction of an administrator and customizing a printing screen, a printing step of performing printing in response to reception of a printing start instruction, a first displaying step of displaying the customized printing screen during the printing step, and a customized information processing step of enabling customized information corresponding to the customized printing screen to be confirmed after printing, when an execution instruction by a user is received during displaying the customized printing screen.

9 Claims, 3 Drawing Sheets

(56) References Cited

U.S. PATENT DOCUMENTS

2022/0027098 A1   1/2022   Miyata
2022/0094802 A1   3/2022   Takayama

* cited by examiner

PRINTING METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2020-156899, filed Sep. 18, 2020, the disclosure of which is hereby incorporated by reference herein in its entirety.

BACKGROUND

1. Technical Field

The present disclosure relates to a printing method, an information processing device, and a non-transitory computer-readable storage medium storing a program.

2. Related Art

In multifunction devices in the related art, a user waiting time occurs during execution of a job such as a print job. JP-A-2019-202441 discloses a technique for displaying a progress status of printing during the waiting time.

When various contents can be displayed in addition to the progress status of printing during printing, the waiting time until the end of printing can be effective for the user.

SUMMARY

According to an aspect of the present disclosure, there is provided a printing method including a customizing step of receiving a customization instruction of an administrator and customizing a printing screen, a printing step of performing printing in response to reception of a printing start instruction, a first displaying step of displaying the customized printing screen during the printing step, and a customized information processing step of setting customized information corresponding to the customized printing screen as information to be displayed after printing or transmitting the customized information to an external device, when an execution instruction by a user is received during displaying the customized printing screen.

According to another aspect of the present disclosure, there is provided an information processing device including a customizing section that receives a customization instruction of an administrator and customizes a processing screen, a first processing section that performs processing in response to reception of a processing start instruction, a display processing section that displays the customized processing screen during the processing by the first processing section, and a customized information processing section that sets customized information corresponding to the customized processing screen as information to be displayed after the processing by the first processing section or transmits the customized information to an external device, when an execution instruction by a user is received during displaying the customized processing screen.

According to yet another aspect of the present disclosure, there is provided a non-transitory computer-readable storage medium storing a program, the program causing a computer to function as a customizing section that receives a customization instruction of an administrator and customizes a processing screen, a first processing section that performs processing in response to reception of a processing start instruction, a display processing section that displays the customized processing screen during the processing by the first processing section, and a customized information processing section that sets customized information corresponding to the customized processing screen as information to be displayed after the processing by the first processing section or transmits the customized information to an external device, when an execution instruction by a user is received during displaying the customized processing screen.

DESCRIPTION OF EXEMPLARY EMBODIMENTS

Here, embodiments of the present disclosure will be described in the following order.
1. Configuration of Multifunction Device:
2. Printing Processing
3. Other Embodiments

1. Configuration of Multifunction Device of First Embodiment

Figure 1:
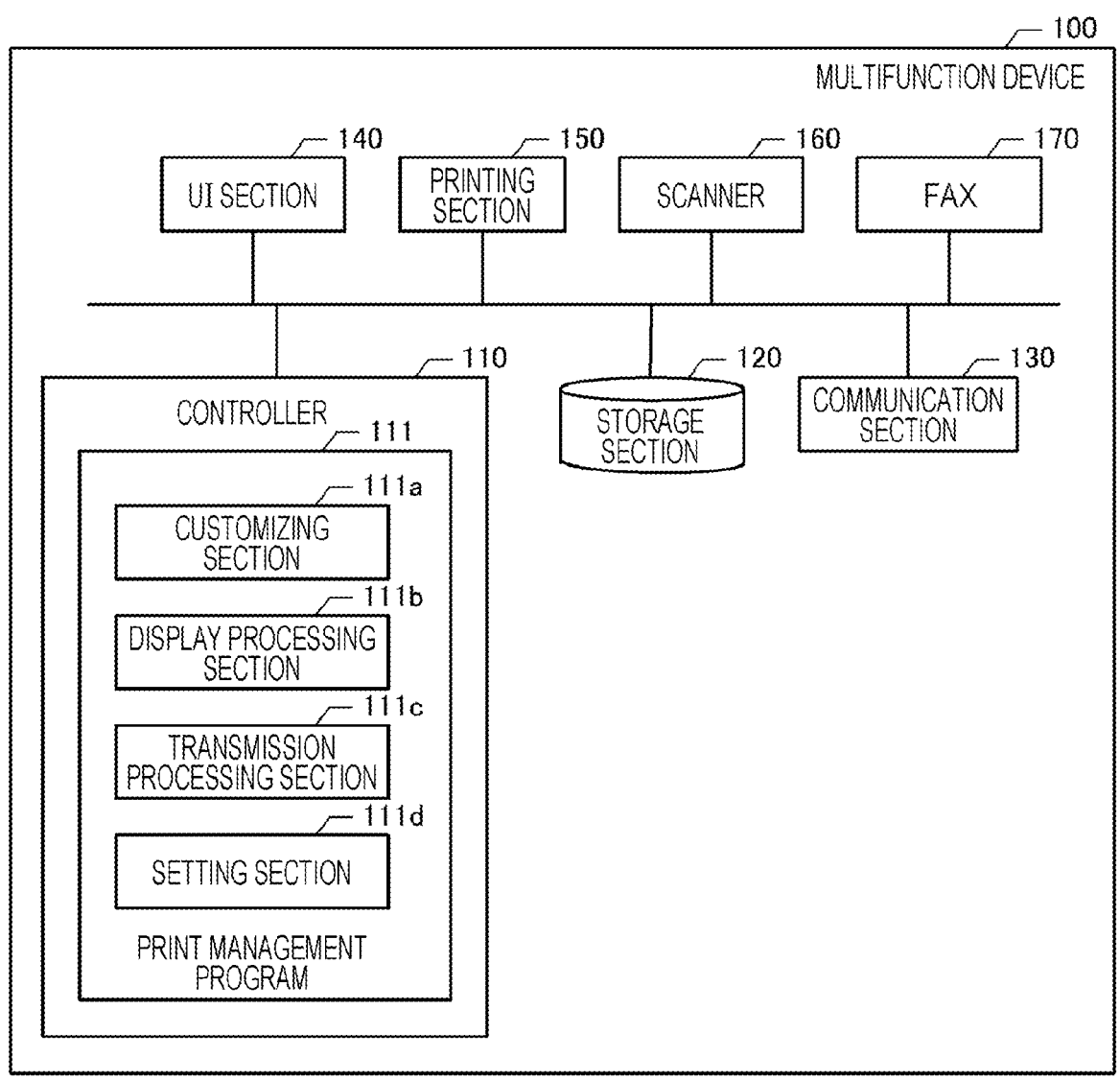
FIG. 1 is a block diagram of a multifunction device.

FIG. 1 is a block diagram showing a configuration of a multifunction device 100 as a printing device according to a first embodiment. The multifunction device 100 includes a controller 110, a storage section 120, a communication section 130, a user interface (UI) section 140, a printing section 150, a scanner 160, and a FAX 170.

The controller 110 includes a processor such as a CPU (not shown), a ROM, a RAM, and the like, and the CPU executes various programs recorded in the ROM and the like by using the RAM and the like to control each section of the multifunction device 100. The controller 110 may be constituted by a single chip or may be constituted by a plurality of chips. Further, the controller 110 may be configured as a SoC together with various functional blocks for operating the multifunction device 100. Further, in the controller 110, an ASIC may be employed instead of the CPU. Further, in the controller 110, the CPU and the ASIC may operate in cooperation with each other.

The storage section 120 is, for example, a hard disk, and stores various information and various programs. The communication section 130 includes a communication interface circuit for communicating with other devices coupled to the multifunction device 100 by wire or wirelessly according to various communication protocols. The controller 110 can receive print data from another device coupled via the communication section 130. The UI section 140 includes a touch panel type display, various keys, switches, and the like. The controller 110 can acquire the operation content of the user via the UI section 140. Further, the controller 110 can display various information on the display of the UI section 140 and notify the user.

The printing section 150 includes actuators, sensors, drive circuits, mechanical parts, and the like for printing on various print media by a well-known printing method such as an ink jet method and an electrophotographic method.

The scanner 160 includes a device for reading a document, for example, a well-known color image sensor or a light source, an actuator for transporting the document, and a drive circuit, a sensor for detecting the size of a document, mechanical parts, and the like. The scanner 160 irradiates the set document with light from a light source, and performs scanning with the light from the document. The FAX 170 transmits and receives images via the communication section 130.

The controller 110 of the present embodiment displays the content customized by the administrator or the like on the printing screen displayed on the display during printing. The controller 110 functions as a customizing section 111a, a display processing section 111b, a transmission processing section 111c, and a setting section 111d by executing a print management program 111 in order to perform such processing. That is, the processing described below as what each functional section performs is a processing performed by the controller 110 executing the print management program 111.

When the customizing section 111a receives a customization instruction from the administrator via the UI section 140, the customizing section 111a customizes the printing screen according to the customization instruction. Here, the administrator is, for example, a user who has been authenticated as an administrator by inputting a password to the UI section 140 of the multifunction device 100, or performing authentication with a security card. A known authentication method such as biometric authentication can be employed for the authentication.

Figure 2:
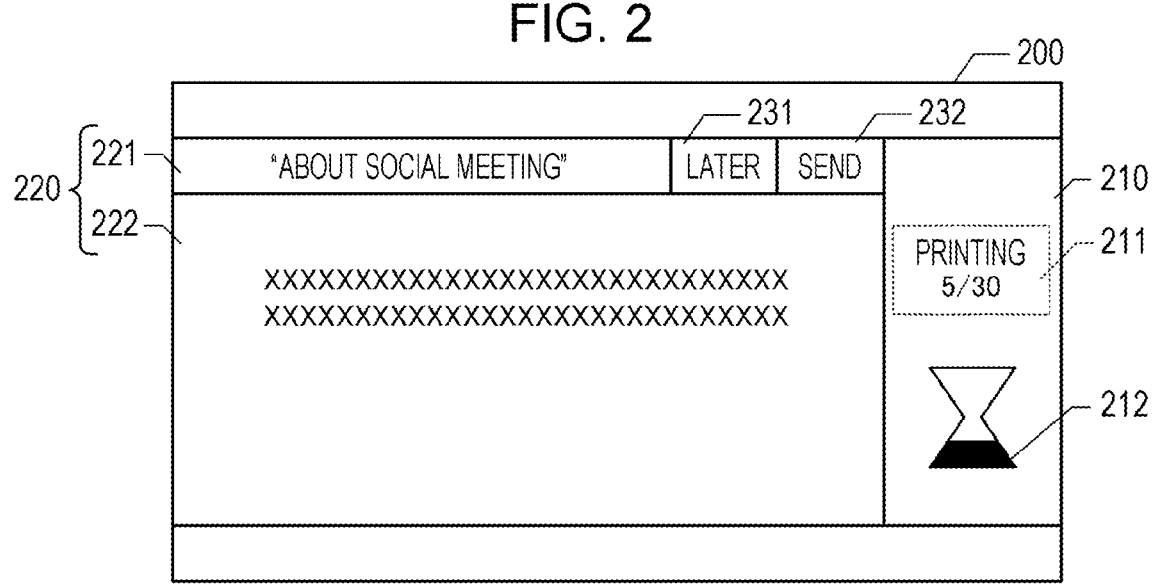
FIG. 2 is a diagram showing a display example of a printing screen.

FIG. 2 is a diagram showing a display example of a printing screen. The printing screen 200 is provided with a print status notification area 210 and a customization area 220. In the print status notification area 210, text information 211 indicating the progress status of printing and an icon 212 indicating that printing is in progress are displayed. The customization area 220 is an area that can be customized according to the instructions of the administrator. The content displayed in the customization area 220 is information customized by the administrator, that is, information set by the administrator. Hereinafter, the information displayed in the customization area 220 is referred to as customized information.

The customized information includes solutions to printing problems, maintenance function guidance, function guidance in print mode, in-house notifications, company mottos, and the like. The customized information is not limited to the information shown in the embodiment. In the present embodiment, the customization area 220 is provided with a heading area 221 and a text area 222, in which the heading and the text of the customized information are displayed, respectively. On the printing screen 200, a later button 231 and a send button 232 are appropriately displayed.

When the later button 231 is selected, the customized information displayed on the printing screen 200 is set as the information to be displayed after printing. When the send button 232 is selected, the customized information displayed on the printing screen 200 is transmitted to the e-mail address of the user who is performing printing. The processes will be described in detail later.

The customization area 220 is an area that can be customized. Meanwhile, the print status notification area 210 is a fixed area that cannot be customized. The area where the later button 231 and the send button 232 are displayed is also a fixed area that cannot be customized. In this way, the reference to "customizing the printing screen" does not mean that all of the printing screen can be customized.

Description will be made referring back to FIG. 1. When the display processing section 111b receives a printing start instruction in response to the user operation, the display processing section 111b displays the customized printing screen 200 on the display of the UI section 140. The display processing section 111b displays the send button 232 on the printing screen 200 when a user who has input the printing start instruction is an authenticated user, and puts the send button 232 into non-display when the user is an unauthenticated user. This is because a destination of the customized information cannot be specified in the case of an unauthenticated user. Hereinafter, the user who has input the printing start instruction is referred to as an operating user. In the case of an authenticated user, the display processing section 111b displays the later button 231. In the case of an unauthenticated user, the display processing section 111b also determine whether or not to display the later button 231 depending on whether the shared mailbox is enabled or not.

Figure 3:
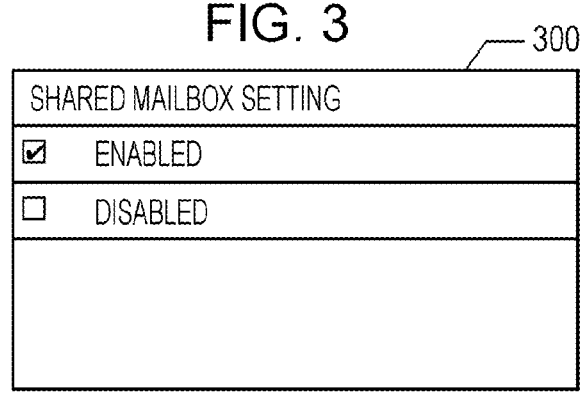
FIG. 3 is a diagram showing a display example of a shared mailbox setting screen.

When the operating user is an unauthenticated user, the display processing section 111b determines whether or not the shared mailbox is enabled. Then, the display processing section 111b displays the later button 231 when the shared mailbox is enabled, and puts the later button 231 into non-display when the shared mailbox is not enabled. Here, the shared mailbox will be described. A personal mailbox and a shared mailbox corresponding to each authenticated user are assigned to the storage section 120 of the multifunction device 100. The shared mailbox is a storage area that users can freely access regardless of whether it is authenticated or non-authenticated. When "enabled" is selected on a shared mailbox setting screen 300 as shown in FIG. 3, the shared mailbox is set to be enabled.

The transmission processing section 111c transmits various information to an external device via the communication section 130. When the transmission processing section 111c receives a transmission execution instruction in response to the selection of the send button 232, the transmission processing section 111c transmits the customized information to an information processing device possessed by the operating user. Examples of the information processing device include a PC and a smartphone. Specifically, the transmission processing section 111c uses a mailer function to transmit the customized information to the e-mail address of the user. Here, the customized information transmitted is information displayed in the customization area 220 of the printing screen 200 together with the send button 232, and includes a heading and a text. It is assumed that the e-mail address as a destination is stored in the storage section 120 in association with the user ID of the operating user. In this way, the transmission processing section 111c transmits the customized information to the e-mail address of the user according to the instruction from the operating user. Therefore, the operating user can reconfirm the customized information at a convenient timing after printing.

The setting section 111d sets the customized information as the information to be displayed after printing when the setting execution instruction is received with the selection of the later button 231. Specifically, when the operating user is an authenticated user, the setting section 111d stores the customized information in the storage area assigned to the personal mailbox of the operating user in the storage section 120. Further, when the operating user is an unauthenticated user, the setting section 111d stores the customized information in the storage area assigned to the shared mailbox in the storage section 120.

For example, let's assume that a mailbox is displayed on the home screen displayed after printing, and an authenticated user who is an operating user opens his/her own personal mailbox. In this case, the display processing section 111b receives a display instruction in response to the operation of opening the personal mailbox, and displays the customized information stored in the personal mailbox on the display according to the display instruction. Further, when an unauthenticated user who is an operating user opens the shared mailbox, the display processing section 111b receives a display instruction in response to the operation of opening the shared mailbox, and displays the customized information stored in the shared mailbox on the display according to the display instruction.

Figure 4:
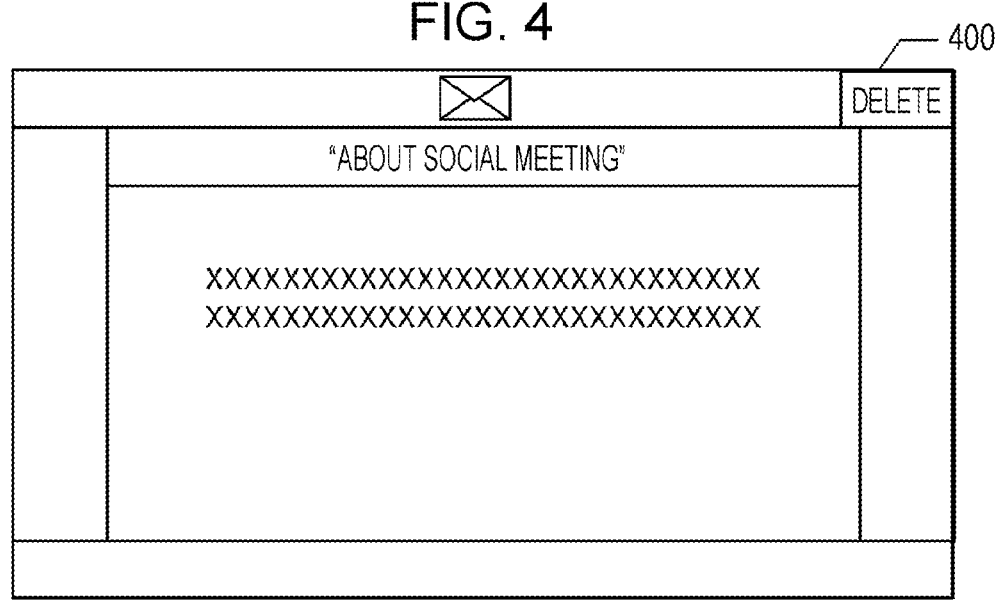
FIG. 4 is a diagram showing a display example of a customized information display screen.

In either case, the display processing section 111b simultaneously displays the heading and the text of the customized information on the display. FIG. 4 is a diagram showing an example of a customized information display screen 400. In this way, the display processing section 111b can display the customized information stored in the storage section 120 on the display according to the display instruction. Therefore, the operating user can reconfirm the customized information at a convenient timing after printing. For another example, the display processing section 111b first displays a list of headings of customized information according to the display instruction, and when a predetermined heading is selected, displays a text corresponding to the selected heading.

When the display time of the printing screen 200 is relatively long, such as when the number of printed sheets is large, the user can confirm all the customized information displayed in the customization area 220 of the printing screen 200. However, when the display time of the printing screen 200 is relatively short, such as when the number of printed sheets is small, the user ends the display of the printing screen 200 before finishing confirming the customized information. In such a case, it is conceivable to extend the display time, but in this case, it is necessary to delay the next printing processing itself so as to correspond to the screen, which is not appropriate from the viewpoint of efficiently performing the printing processing. Therefore, in the present embodiment, the customized information is stored in the storage section 120 or transmitted to the device of the user so that the customized information can be viewed by the user after printing.

2. Printing Processing of First Embodiment

Figure 5:
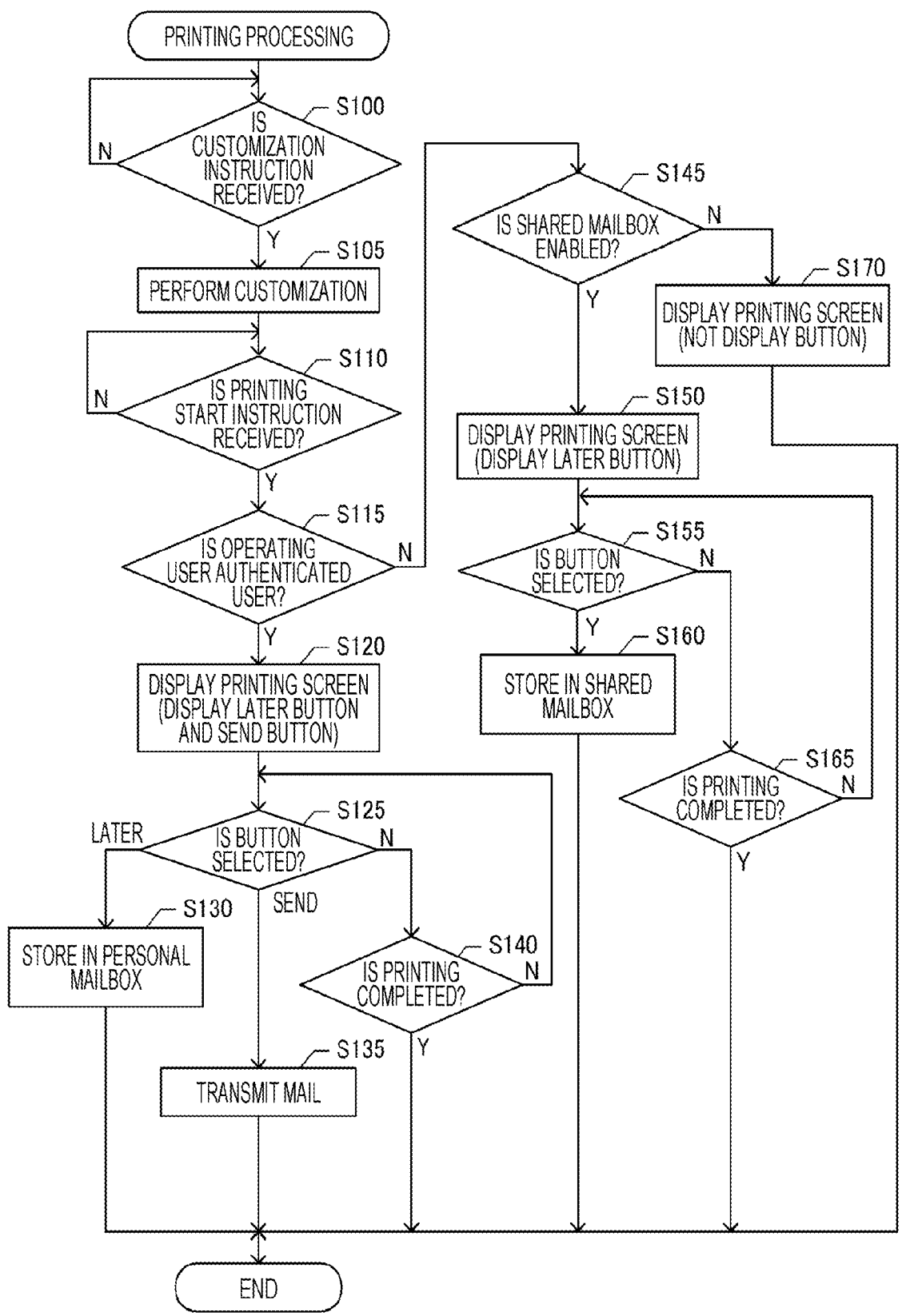
FIG. 5 is a flowchart showing printing processing.

FIG. 5 is a flowchart showing customization by the controller 110 of the multifunction device 100 according to the present embodiment and printing processing following the customization. The flowchart starts when the start-up of the multifunction device 100 is completed and transitions to a normal state. Then, the processing when other instructions such as scanning are given is omitted. In the printing processing, the customizing section 111a determines whether or not the customization instruction has been received (step S100). The customizing section 111a waits until the customization instruction is received (N in step S100), and when the customization instruction is received (Y in step S100), customizes the customization area of the printing screen according to the customization instruction (step S105). Specifically, the customizing section 111a generates text information indicating text input by an administrator. The text information is stored in the storage section 120.

Next, the controller 110 determines whether or not the printing start instruction has been received (step S110). The controller 110 waits until the printing start instruction is received (N in step S110), and when the printing start instruction is received (Y in step S110), determines whether or not the operating user is an authenticated user (step S115). When the printing start instruction is received, the printing section 150 starts printing. The authenticated user is a user who has been authenticated by inputting a password to the UI section 140 or the like. A user who has not been authenticated in this way is an unauthenticated user. Further, data to be printed includes data instructed to be printed by the information processing device of the user, in addition to data instructed to be copied in the multifunction device 100. In printing for targeting the data instructed to be printed by the information processing device of the user, the user is regarded as an automatically logged-in authenticated user.

When the operating user is an authenticated user (Y in step S115), the display processing section 111b displays the printing screen 200 on the display (step S120). Customized information is displayed in the customization area 220 of the printing screen 200 displayed at this time. Further, the later button 231 and the send button 232 are displayed on the printing screen 200. That is, the operating user can select the later button 231 or the send button 232 as desired.

When the later button 231 is selected (Later in step S125), the setting section 111d stores the customized information displayed on the printing screen 200 in the personal mailbox of the operating user (step S130). Then, the processing ends. When the send button 232 is selected (Send in step S125), the transmission processing section 111c transmits the customized information by e-mail to the e-mail address of the operating user (step S135). Then, the processing ends. If there is no button selection (N in step S125), the controller 110 confirms whether or not printing is completed (step S140). If printing is not completed (N in step S140), the controller 110 advances the processing to S125. When printing is completed (Y in step S140), the processing ends.

On the other hand, when the operating user is a non-authenticated user (N in step S115), the display processing section 111b further determines whether or not the shared box is enabled (step S145). When the shared mailbox is enabled (Y in step S145), the display processing section 111b displays the printing screen 200 on the display (step S150). Customized information is displayed in the customization area 220 of the printing screen 200 displayed at this time. Further, on the printing screen 200, the later button 231 is displayed, but the send button 232 is not displayed. In this case, the operating user can select the later button 231 as desired. When the later button is selected (Y in step S155), the setting section 111d stores the customized information displayed on the printing screen 200 in the shared mailbox (step S160). Then, the processing ends. When there is no button selection (N in step S155), the controller 110 confirms whether or not printing is completed (step S165). If printing is not completed (N in step S165), the controller 110 advances the processing to S155. When printing is completed (N in step S165), the processing ends.

When the operating user is a non-authenticated user and the shared box is disabled (N in step S145), the display processing section 111b displays the printing screen 200 on the display (step S170). Customized information is displayed in the customization area 220 of the printing screen 200 displayed at this time. Further, neither the later button 231 nor the send button 232 is displayed on the printing screen 200. Then, the processing ends.

As described above, in the present embodiment, the multifunction device 100 sets the customized information as information to be displayed after printing, or transmits the customized information to the device of the user. Therefore, the user can confirm the customized information after printing. In this way, the customized information set by the administrator can be displayed on the printing screen regardless of the printing progress status, and thus the waiting time of the user until the end of printing can be made effective.

3. Other Embodiments

The above embodiment is an example for implementing the present disclosure, and various other embodiments can be employed. For example, in the present embodiment, the multifunction device has been described as an example of the printing device, but the printing device may be a device having only a printing function. The embodiment can also be applied to functions other than the printing function. For example, the customized information may be displayed on the scanning screen displayed during scanning, and the customized information may be stored or transmitted.

Further, the embodiment can be applied not only to a printing device but also to an information processing device. For example, the processing screen displayed during processing for a predetermined function of the information processing device may be customized, and the information displayed on the customized processing screen may be stored or transmitted as appropriate. In the information processing device, a writing screen displayed while writing data to the hard disk (HDD), an erasing screen displayed while erasing data from the HDD, and the like are listed as processing targets.

The printing screen described in the embodiment is a screen displayed to notify the user that printing is in progress during printing. The printing screen may include customized information, and the content displayed other than the customized information is not limited to the embodiment.

The administrator who can set the customized information may be an administrator who manages the customized information, may be an administrator of the multifunction device 100, or may be a person in charge of setting the customized information.

In the present embodiment, the customized information has been described as being transmitted to the e-mail address, but the method of transmitting the customized information is not limited to the e-mail transmission. For another example, when the printer driver of the multifunction device 100 is installed in an information processing device possessed by the user, the printer driver may receive the customized information.

The customized information may be any information to be displayed, and is not limited to text information. The customized information may be an image in addition to or in place of text, and may be a combination of shapes, patterns, and colors of an image and text. Further, options on the customized information are prepared in advance, and one piece of customized information selected from a plurality of pieces of customized information selected by the administrator may be displayed. Further, the customized information may be present outside the multifunction device 100 such as a server designated by the administrator, and the multifunction device may acquire the customized information from the outside immediately before displaying the customized information.

The multifunction device 100 of the present embodiment has been described as displaying the later button 231 and the send button 232, but instead, only one of the buttons may be displayed. In this case, the later button 231 is displayed when the shared mailbox is enabled, and is not be displayed when the shared mailbox is disabled. Further, the send button 232 is displayed when the operating user is an authenticated user, and is not displayed when the operating user is an unauthenticated user.

In the present embodiment, the customized information has been described as being stored in the area corresponding to the mailbox. However, the setting section 111d may perform processing of setting the customized information as information to be displayed after printing, and does not necessarily have to perform processing of newly storing the customized information. For another example, when the operating user is an authenticated user, the setting section 111d stores a flag indicating that the customized information displayed on the printing screen 200 is information to be displayed after printing and the user ID of an authenticated user in association with each other. In addition, when the operating user is an unauthenticated user, the setting section 111d stores a flag indicating that the customized information displayed on the printing screen 200 is information to be displayed after printing and information for identifying the shared mailbox in association with each other. Therefore, after printing, customized information can be displayed depending on the selection of the personal mailbox or the shared mailbox, as described in the embodiment.

Further, both the later button 231 and the send button 232 may be selectable. In this case, the controller 110 stores and transmits customized information.

Further, customized information displayed during printing, customized information displayed after printing, and customized information transmitted are not limited to exactly the same. As long as the customized information have the same meaning, the customized information may be regarded as the same, for example, even if there is a difference in the presence or absence of line breaks or a difference in the typeface. Alternatively, even if a figure and words that express the figure are presented, which are different from each other, they may be regarded as the same customized information. Furthermore, when a link is transmitted for displaying the customized information displayed during printing on a browser, the link can also be regarded as customized information.

Further, embodiments can be implemented as a program or a method. Further, the device, program, and method as described above may be implemented as a single device or may be implemented by using parts provided in a plurality of devices, and include various aspects. In addition, some are software and some are hardware, which can be changed as appropriate. Further, the present disclosure is also established as a recording medium for a program that controls a system. Of course, the recording medium for the program may be a magnetic recording medium or a semiconductor memory, and any recording medium to be developed in the future can be considered in exactly the

What is claimed is:
1. A printing method comprising:
receiving a customization instruction of an administrator and customizing a printing screen;
performing printing at a printing device in response to reception of a printing start instruction;
displaying a customized printing screen in which the printing screen has been customized based on the customization instruction, the customized printing screen being displayed at the printing device after starting of the printing in response to the reception of the printing start instruction and during the printing, the customized printing screen automatically not being displayed after ending of the printing; and performing customized information processing of
   setting customized information corresponding to the customized printing screen as information to be displayed after the ending of the printing, when an execution instruction for the setting is received from a user during the displaying of the customized printing screen, or
   transmitting the customized information to an external device, when an execution instruction for the transmitting is received from a user during the displaying of the customized printing screen.

2. The printing method according to claim 1, wherein
in the performing of the customized information processing, the customized information is set as the information to be displayed after the ending of the printing when the execution instruction for the setting is received, and
the printing method further comprises displaying the customized information after the ending of the printing.

3. The printing method according to claim 2, wherein
when the customized information is set in response to the execution instruction for the setting by an authenticated user, in the displaying of the customized information, the customized information is displayed when a display instruction is received from the authenticated user.

4. The printing method according to claim 1, wherein
in the performing of the customized information processing, the customized information is transmitted to a device of the user when the execution instruction for the transmitting is received.

5. The printing method according to claim 1, wherein
in the displaying of the customized printing screen,
a button that receives the execution instruction for each of the setting and the transmitting is displayed on the customized printing screen, when the printing is executed by an instruction of an authenticated user, and
a button that receives the execution instruction for the setting is displayed and a button that receives the execution instruction for the transmitting is not displayed on the customized printing screen, when the printing is executed by an instruction of an unauthenticated user.

6. The printing method according to claim 1, wherein
in the customizing, a customization area of the printing screen is customized and a fixed area thereof is not customized.

7. The printing method according to claim 1, wherein
the customized information includes text information input by the administrator.

8. An information processing device comprising:
a processor constituting
   a customizing section that receives a customization instruction of an administrator and customizes a processing screen,
   a first processing section that performs processing in response to reception of a processing start instruction,
   a display processing section that displays a customized processing screen in which the processing screen has been customized based on the customization instruction, the customized processing screen being displayed at the information processing device after starting of the processing in response to the reception of the processing start instruction and during the processing by the first processing section of the information processing device, the customized processing screen automatically not being displayed after ending of the processing, and
   a customized information processing section that
     sets customized information corresponding to the customized processing screen as information to be displayed after the ending of the processing by the first processing section, when an execution instruction for setting of the customized information is received from a user during displaying of the customized processing screen, or
     transmits the customized information to an external device, when an execution instruction for transmitting of the customized information is received from a user during the displaying of the customized processing screen.

9. A non-transitory computer-readable storage medium storing a program, the program causing a computer to function as:
a processor constituting
   a customizing section that receives a customization instruction of an administrator and customizes a processing screen,
   a first processing section that performs processing in response to reception of a processing start instruction,
   a display processing section that displays a customized processing screen in which the processing screen has been customized based on the customization instruction, the customized processing screen being displayed at the information processing device after starting of the processing in response to the reception of the processing start instruction and during the processing by the first processing section of the information processing device, the customized processing screen automatically not being displayed after ending of the processing, and
   a customized information processing section that
     sets customized information corresponding to the customized processing screen as information to be displayed after the ending of the processing by the first processing section, when an execution instruction for setting of the customized information is received from a user during displaying of the customized processing screen, or
     transmits the customized information to an external device, when an execution instruction for transmitting of the customized information is received from a user during the displaying of the customized processing screen.

\* \* \* \* \*